United States Patent [19]

Pricone et al.

[11] Patent Number: 4,601,861

[45] Date of Patent: * Jul. 22, 1986

[54] METHODS AND APPARATUS FOR EMBOSSING A PRECISION OPTICAL PATTERN IN A RESINOUS SHEET OR LAMINATE

[75] Inventors: Robert M. Pricone, Vernon Hills; William N. Roberts, Niles, both of Ill.

[73] Assignee: Amerace Corporation, Hackettstown, N.J.

[ * ] Notice: The portion of the term of this patent subsequent to Dec. 4, 2001 has been disclaimed.

[21] Appl. No.: 640,011

[22] Filed: Aug. 10, 1984

Related U.S. Application Data

[63] Continuation-in-part of Ser. No. 430,860, Sep. 30, 1982, Pat. No. 4,486,363.

[51] Int. Cl.$^4$ ............................................. B29D 11/00
[52] U.S. Cl. ...................... 264/1.6; 264/1.9; 264/2.7; 264/284; 425/71; 425/373; 425/385
[58] Field of Search ............... 264/1.3, 1.4, 1.6, 1.9, 264/2.7, 106, 107, 284, 235, 346; 425/174.4, 373, 384, 385, 404, 446, 71

[56] References Cited

U.S. PATENT DOCUMENTS

| | | | |
|---|---|---|---|
| 3,595,836 | 7/1971 | Korneli et al. | 264/235 |
| 3,758,649 | 9/1973 | Frattaola | 264/2.7 |
| 4,244,683 | 1/1981 | Rowland | 425/143 |
| 4,486,363 | 12/1984 | Pricone et al. | 264/1.6 |

FOREIGN PATENT DOCUMENTS

| | | | |
|---|---|---|---|
| 18777 | 9/1939 | Japan | 264/346 |
| 54513 | 3/1984 | Japan | 264/235 |

Primary Examiner—James Lowe
Attorney, Agent, or Firm—David Teschner; Ronald Sandler

[57] ABSTRACT

Disclosed herein are an improved method and apparatus for continuously embossing a repeating pattern of precise detail, in particular, cube-corner type reflector elements, on one surface of a single sheet or on one surface of a laminate of transparent thermoplastic materials, to form retroreflective sheeting. A continuous embossing tool in the form of a flexible thin metal belt or cylinder has on its outer surface an embossing pattern which is the reverse of the precision optical pattern to be formed. The embossing tool is continuously moved at a predetermined speed along a closed course through a heating station where the temperature of a portion of the embossing tool is raised to be above the glass transition temperature of the sheeting or laminate and a cooling station where the heated portion of the embossing tool is cooled while in a relatively planar condition to be below that glass transition temperature. The sheeting is continuously moved at the predetermined speed from a supply thereof into engagement with the embossing pattern on the tool and is pressed thereagainst continuously at a plurality of pressure points sequentially spaced along the heating station, with the one surface of the sheeting confronting and engaging the embossing pattern until the sheeting is raised above its glass transition temperature and conforms to the embossing pattern on the one face. The sheeting is maintained in engagement with the tool until the tool passes through the cooling station and the sheeting is lowered below its glass transition temperature and the pattern solidifies. The sheeting thereafter is stripped from the tool and next passed through a reheating station where the embossed sheeting is heated to an annealing temperature where the stresses formed in the thermoplastic material during cooling are relieved, while preserving and enhancing the precision optical pattern previously formed.

23 Claims, 4 Drawing Figures

METHODS AND APPARATUS FOR EMBOSSING A PRECISION OPTICAL PATTERN IN A RESINOUS SHEET OR LAMINATE

CROSS-REFERENCE TO RELATED APPLICATION

This application is a continuation-in-part of co-pending application U.S. Ser. No. 430,860, filed Sept. 30, 1982, of Sidney A. Heenan and Robert M. Pricone, now U.S. Pat. No. 4,486,363, issued Dec. 4, 1984, and assigned to the same assignee as the present application. The subject matter of that co-pending application Ser. No. 430,860 is incorporated herein by reference.

BACKGROUND OF INVENTION

This invention relates to improved methods and apparatus for producing sheeting having precision patterns where flatness and angular accuracy are important, such as for optical purposes, such as Fresnel lenses incorporating cadioptrics, precise flats, angles and uniform detail, and, more particularly, to improved methods and apparatus for continuously embossing a repeating retroreflecting pattern of fine or precise detail on one surface of sheeting of transparent thermoplastic material or a laminate of such materials to form the sheeting into the desired pattern. Specifically, the techniques are applicable to produce cube-corner type retroreflective sheeting.

Cube-corner type reflectors have been known for many years and many millions have been sold. The phrase "cube-corner" or "trihedral", or "tetrahedron" are art recognized terms for structure consisting of three mutually perpendicular faces, without regard to the size or shape of each face, or the optical axis of the element so provided. Each of the faces can assume a different size and shape relative to the other two, depending upon the angular reflective characteristics desired, and the molding techniques employed. One example of a cube corner type reflector is provided by Stimson U.S. Pat. No. 1,906,655, issued May 2, 1933, wherein there is disclosed a reflux light reflector including an obverse face and a reverse light reflecting face consisting of a plurality of cube corner reflector elements, each having three mutually perpendicular surfaces adapted for total internal reflection of light impinging thereon from the obverse face. Reflectors as taught by the Stimson patent are individually molded and are relatively quite thick and rigid. For many years now, the preferred material for cube-corner type reflectors has been methyl methacrylate. Another example of a cube-corner type reflector is the rectangular parallelepiped disclosed in Heasley U.S. Pat. No. 4,073,568.

It long has been desired to obtain the benefits of cube-corner reflectors as used in pavement markers or for automotive purposes, but with the reflector in the form of flexible sheeting. This involves, among other things, a drastic reduction in the size of the cube-corner elements.

Cube-corner type reflectors, to retain their functionality of reflecting light back generally to its source, require that the three reflective faces be maintained flat and within several minutes of 90° relative to each other; spreads beyond this, or uneveness in the faces, results in significant light spread and a drop in intensity at the location desired.

Prior attempts have been made to produce reflective sheeting wherein the reflective elements are of the cube-corner type. For many years, it was suggested that cube-corner sheeting could not be manufactured using embossing techniques (e.g. Rowland U.S. Pat. No. 3,684,348, Col. 5 ii. 30–42).

A more recent attempt at embossing cube-corner sheeting is that of Rowland U.S. Pat. No. 4,244,683, issued Jan. 13, 1981. However, the method and apparatus of Rowland U.S. Pat. No. 4,244,683 are relatively quite complex and only semi-continuous or sequential in nature. Consequently, the Rowland teaching is quite costly to implement, maintain and operate. The operation is slow and the resultant reflective sheeting is quite costly. Moreover, to produce sheeting 48" wide, to be economically feasible, would be prohibitively expensive and complicated using the sequential mold technique of Rowland '683.

Also known are other prior techniques for embossing repeating patterns on thermoplastic sheeting, among which other prior techniques are those taught by the following:

Swallow U.S. Pat. No. 2,442,443, issued June 1, 1948;

Hochberg U.S. Pat. No. 3,157,723, issued Nov. 17, 1964;

Kloender U.S. Pat. No. 3,246,365, issued Apr. 19, 1966;

Bergh U.S. Pat. No. 4,097,634, issued June 27, 1978; and

Nyfeler et al. U.S. Pat. No. 4,223,050, issued Sept. 16, 1980.

These other prior techniques do not involve the production of retroreflective sheeting or the precision patterns required for optical purposes. As noted, in order for cube-corner reflective sheeting to be successful, the embossed cube-corner elements must be extremely accurately formed, much more so than is required of the embossed elements of these "other prior techniques", which, therefore, although they may be satisfactory for producing the intended products, may not be adaptable to the production of cube-corner reflective sheeting.

In co-pending parent application Ser. No. 430,860, now U.S. Pat. No. 4,486,363, there is disclosed a novel method and apparatus for continuously embossing a precision optical pattern on one surface of a continuous resinous sheeting material. The present invention discloses and claims improved methods and apparatus capable of producing embossed cube-corner type sheeting having signficantly higher degrees of reflective efficiency.

Accordingly, an important object of the present invention is to provide improved methods and apparatus for embossing a repeating retroreflective pattern of cube-corner reflecting elements on one face of sheeting of transparent thermoplastic material, or a laminate of such materials, which methods and apparatus operate continuously and are greatly simplified with respect to the prior art.

Another important object is to provide such improved methods and apparatus which are relatively inexpensive, in terms of implementation and operation, yet when used in conjunction with the inventions disclosed and claimed in applicants' parent application, operate to provide significant increases in reflectivity in the final embossed product.

A further important object is to provide such improved methods and apparatus enabling continuous production of cube-corner reflective sheeting of reduced cost.

The foregoing and other objects and advantages will appear from the following description of examples of the invention.

SUMMARY OF THE INVENTION

As stated, the present invention relates to improved methods and apparatus for continuously embossing a repeating retroreflecting pattern of cube-corner reflector elements on one surface of sheeting of thermoplastic material to form the sheeting into retroreflective sheeting. A continuous embossing tool in the form of a thin metal element has on its outer surface an embossing pattern which is the reverse of the retroreflecting pattern. The tool is continuously moved at a predetermined speed along a closed course through a heating station where the temperature of a portion of the embossing tool and pattern is raised to be above the glass transition temperature of the sheeting and a cooling station where the temperature of that portion of the embossing tool is lowered to be below that glass transition temperature. The sheeting is continuously moved at the predetermined speed from a supply thereof into engagement with the embossing element and is pressed against the element either continuously, or at a plurality of pressure points sequentially spaced along said heating station, with one surface of the sheeting confronting and engaging the embossing pattern until the sheeting softens and the one surface conforms to the embossing pattern. The sheeting is maintained in engagement with the tool until the tool passes through a cooling station where the embossed material is abruptly and continuously cooled to a temperature significantly below the glass transition temperature of the sheeting, while in a relatively planar condition, and the sheeting solidifies. The sheeting is thereafter stripped from the tool, and, in a preferred embodiment, is reheated to an annealing temperature where internal stresses caused by embossing and cooling are relieved, while preserving and enhancing the reflective efficiency of the precision optical pattern so formed.

A preferred material for the sheeting is acrylic. The embossing tool preferably is a continuous belt, having the embossing pattern on its outer surface. The heating station is provided by a roller, and the cooling station may comprise a manifold that directs a cooled fluid (liquid or gas) against the embossed sheeting material while the belt and the formed material are in a generally planar condition. The postcooling annealing step is best accomplished after the embossed thermoplastic material is stripped from the embossing tool and while the embossed material is still under moderate tension.

As disclosed in parent application Ser. No. 430,860, it is preferable that the sheeting, prior to engaging the embossing tool, be engaged on its surface remote from the one surface, with a film of thermoplastic material, such as polyester (Mylar), having a glass transition temperature which is higher than that of the sheeting and higher than the temperature of the embossing pattern at the heating station, so that the pressure points exert pressure on the sheeting through the film to cause the one surface of the sheeting to conform to the embossing pattern. The film acts as a carrier for the sheeting in its weak, molten condition and during and after cooling and annealing and keeps the sheeting from tearing. The film also acts as an interleaf between the sheeting and the pressure points, which preferably are pressure rollers of silicone rubber with a durometer hardness from Shore A 60 to 90, which would otherwise tend to stick to the sheeting.

DESCRIPTION OF THE DRAWING

The invention will be described with reference to the accompanying drawings in which.

DESCRIPTION OF THE ILLUSTRATED EMBODIMENTS

Figure 1:
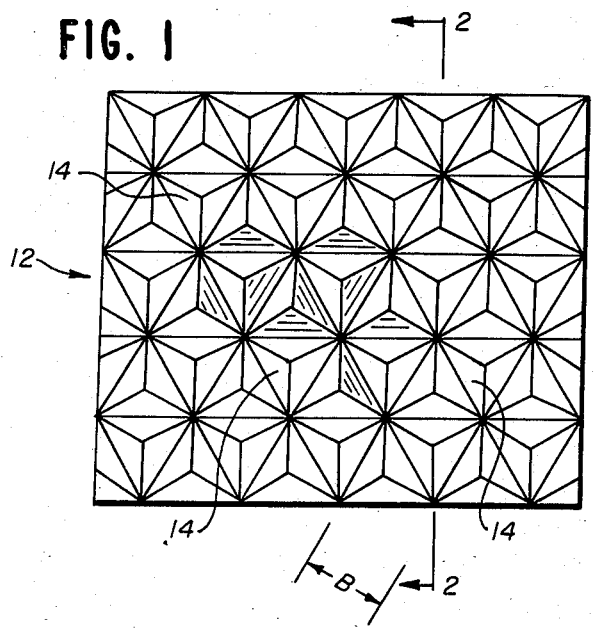
FIG. 1 is a plan view, greatly enlarged and somewhat fragmentary, of the embossed surface of one form of reflective sheeting produced by the present invention.

FIG. 1 shows in plan view the rear surface of a portion of flexible reflective sheeting 12 of transparent thermoplastic material having embossed on one surface thereof a repeating retroreflecting pattern of cube-corner type reflector elements 14. The thermoplastic material may advantageously be acrylic. Sheeting 12 initially had parallel front and back surfaces and was initially on the order of 0.006 inch thick. Alternatively, the sheeting 12 may consist of a laminate of different transparent thermoplastic materials having different characteristics, as hereinafter discussed.

Figure 2:
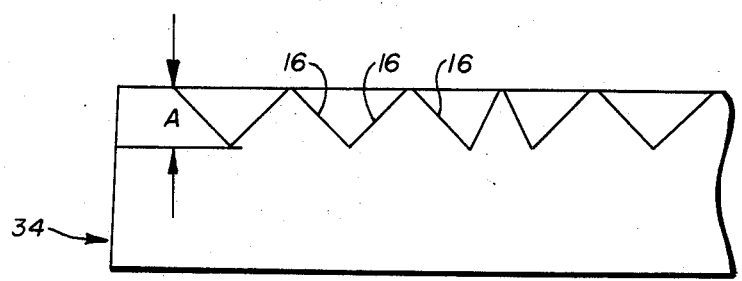
FIG. 2 is a side elevation, somewhat fragmentary and somewhat schematic and very enlarged view, showing the embossing pattern of one form of an embossing tool for embossing the retroreflecting pattern of the sheeting of FIG. 1, as though taken in the direction of the arrows 2—2 in FIG. 1, except that the tool is of female cubes and the sheeting of male cubes.

The retroreflecting pattern of elements 14 was formed with the aid of an embossing tool of a thin flexible belt or cylinder of the type produced in accordance with that invention entitled Embossing Tool and Method of Producing Same, U.S. Application Ser. No. 430,866, filed Sept. 30, 1982, now U.S. Pat. No. 4,478,769, and assigned to applicants' assignee. As Shown in FIG. 2, the embossing tool has on one surface an embossing pattern 16, the depth of which is indicated by dimension A. One example for dimension A may be 0.00338 inch. Dimension B on FIG. 1 represents the distance between parallel grooves, which, for the "A" dimension provided, would be about 0.0072 inch.

In order for sheeting 12 to have adequate optical properties, the embossing pattern 16 must be extremely accurately formed and the retroreflective pattern of the cube corner elements 14 must be an extremely accurate reverse reproduction of the embossing pattern 16. Thus, the embossed surface of the sheeting 12 must conform to the embossing pattern 16 with an extremely high degree of accuracy.

Figure 3:
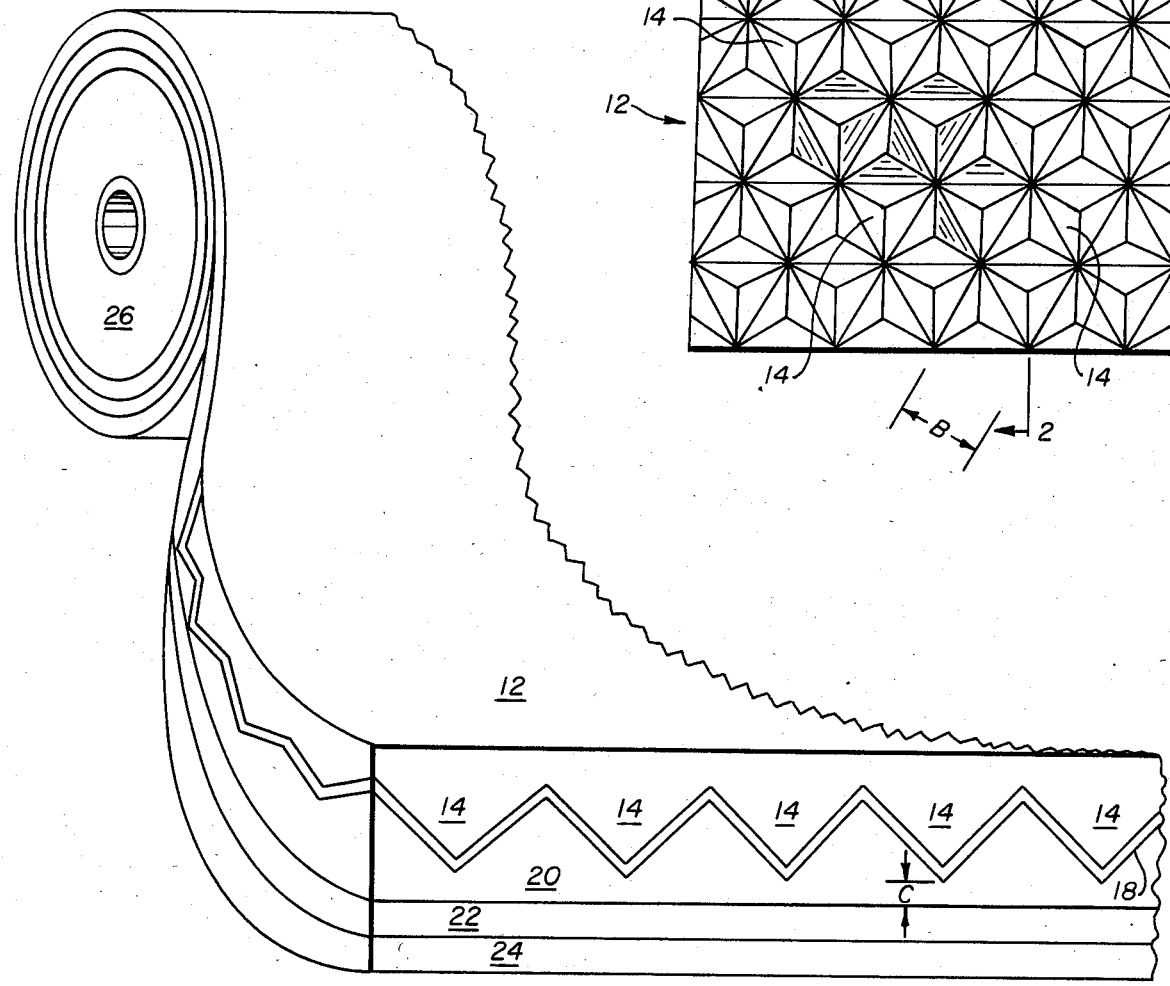
FIG. 3 is a perspective, somewhat schematic view of one form of reflective sheeting produced by the present invention, after further processing has rendered the sheeting ready for installation.

FIG. 3 shows one form of sheeting 12 produced by the present invention, after further processing and ready for use. More specifically, the retroreflective pattern of cube corner elements 14 may be covered with a metallized layer 18, which in turn may be covered by a suitable backing material 20, in turn covered by a suitable adhesive 22 (for mounting), in turn covered by release paper 24. The thickness of the metallizing layer 18 is imeasurable. Backing material 20 may have a thickness, dimension C, of about 0.001 inch and the thickness of adhesive 22 may be about 0.0015 inch. The total thickness of the complete structure 25 is about 0.010 inch, and it is flexible enough so it can be rolled and readily stored on a supply reel 26. The sheeting 12 may be any desired color, to impart that color to retroreflected light. The details of applying a back coat and adhesive are well known in the art and similar to that used in the manufacture of "glass bead" type sheeting. In lieu of metallizing, other materials and/or backcoatings may be applied to the cube-corner elements, such post forming steps not forming part of the present invention.

Figure 4:
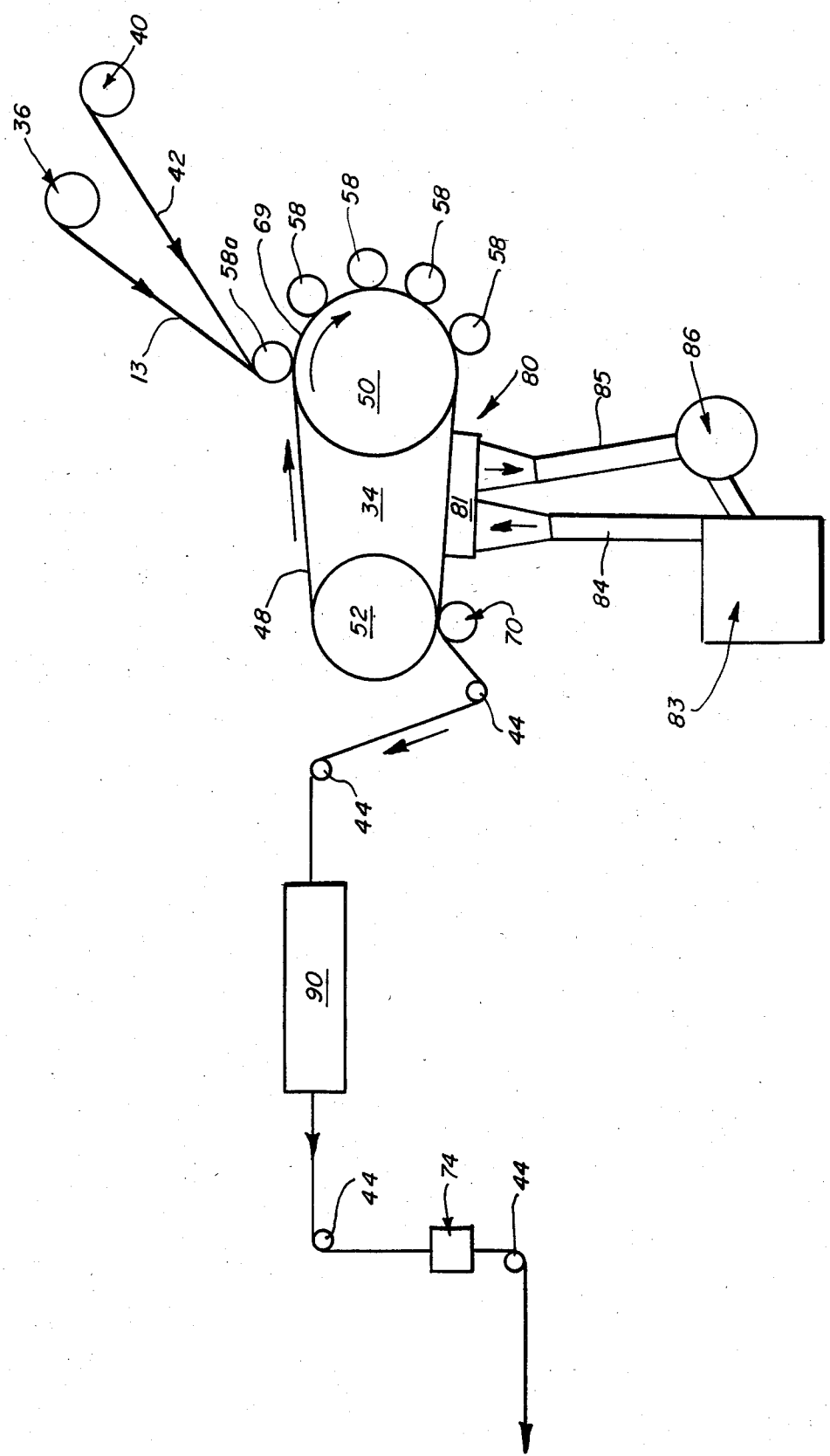
FIG. 4 is a schematic representation of preferred apparatus constructed in accordance with the invention for producing the reflective sheeting of FIGS. 1 and 3, the machine including embossing means comprising an embossing tool in the form of a continuous flexible cylinder, or belt, cooling means, and annealing means.

A preferred machine 28 for producing the cube corner sheeting 12 is shown schematically in elevation in FIG. 4. It will be understood that the specific constructional details of the basic embossing machine 28 are substantially as disclosed in co-pending application U.S. Ser. No. 430,860, and for purposes of convenience, a like numbering system for major components of such system is adopted herein.

A supply reel 36 of unprocessed acrylic web 13 is mounted on the right hand end of the machine, as is a supply reel 40 of transparent plastic film such as Mylar film 42. In the illustrated embodiment, the web 13 may be 0.006 inch thick and the film 42 may be 0.002 inch thick. The flat web 13 and the film 42 are fed from reels 36 and 40, respectively, to the embossing means 34, over guide rollers (not shown), in the direction of the arrows.

The embossing means 34 includes an embossing tool 46 in the form of an endless metal belt 48 which may be about 0.020 inch in thickness and 54 inches in "circumference" and 22 inches wide. The width and circumference of the belt 48 will depend in part upon the width or material to be embossed and the desired embossing speed and the thickness of the belt 48. Belt 48 is mounted on and carried by a heating roller 50 and a postcooling roller 52 having parallel axes. Rollers 50 and 52 may be driven by chains (not shown), to advance belt 48 at a predetermined linear speed in the direction of the arrow. Belt 48 is provided on its outer surface with a continuous female embossing pattern 16 (FIG. 2).

Evenly spaced sequentially around the belt, for about 180° around the heating roller 50, are a plurality, at least three, and as shown five, pressure rollers 58 of a resilient material, preferably silicone rubber, with a durometer hardness ranging from Shore A 20 to 90, but preferably, from Shore A 60 to 90.

While rollers 50 and 52 could be the same size, in machine 28 as constructed, the diameter of heating roller 50 is about 10½ inches and the diameter of post cooling roller 52 is about 8 inches. The diameter of each roller 58 is about 6 inches. For purposes of illustration, the spacing between rollers 50 and 52 is shown as greatly exaggerated, given the dimension of the rollers 50, 52 and the belt 48. It will be understood that the gap or free area between the rollers will differ depending upon the selected dimensions of the tool 48 and rollers 50, 52.

It should be understood that either the heating roller 50 or the postcooling roller 52, may have axial inlet and outlet passages joined by an internal spiral tube for circulation therethrough of hot oil (in the case of heating roller 50) supplied through a supply line or other material (in the case of cooling roller 52) also supplied through appropriate lines.

The web 13 and the film 42, as stated, are fed to embossing means 34, where they are superimposed to form a laminate 69 which is introduced between the belt 48 and the leading pressure roller 58a, with the web 13 between the film 42 and the belt 48. One face of web 13 directly confronts and engages embossing pattern 16 and one face of the film 42 directly confronts and engages pressure rollers 58. The laminate 69 is moved with the belt 48 to pass under the remaining pressure rollers 58 and around the heating roller 50 and from thence along belt 48 through a general planar cooling station 80 located between heating roller 50 and post-cooling roller 52.

The film 42 performs several functions during this operation. First, it serves to maintain the web 13 under pressure against the belt 48 while traveling around the heating and postcooling rollers 50 and 52 and while traversing the distance between them, thus assuring conformity of the web 13 with the precision pattern 16 of the tool during the change in temperature gradient as the web (now embossed sheet) drops below the glass transition temperature of the material. Second, the film maintains what will be the outer surface of the sheeting in a flat and highly finished surface for optical transmission. Finally, the film 42 acts as a carrier for the web in its weak "molten" state and prevents the web from otherwise adhering to the pressure rollers 58 as the web is heated above the glass transition temperature.

The embossing means 34 includes a stripper roller 70, around which laminate 69 is passed to remove the same from the belt 48, shortly before the belt 48 itself contacts postcooling roller 52 on its return path to the heating roller 50.

The laminate 69 is then fed from stripper roller 70 over further guiding rollers 44, to an annealing means 90. The laminate 69 then emerges from the annealing means 90 guided by additional guiding rollers 44, with the film 42 facing outwardly, past a monitoring device 74 for continuously monitoring the optical performance of the embossed reflective sheeting. From there, the finished laminate 69 having the embossed sheeting 13, may be transferred to a wind-up roller (not shown) for removal and further processing.

The heating roller 50 is internally heated (as aforesaid) so that as belt 48 passes thereover through the heating station, the temperature of the embossing pattern 16 at that portion of the tool is raised sufficiently so that web 13 is heated to a temperature above its glass transition temperature, but not sufficiently high as to exceed the glass transition temperature of film 42. For the acrylic web (or sheeting) 13 and polyester film 42, a suitable temperature for heating roller 50 in the heating station is in the range from 425° F. to 475° F., and preferably about 425° F.

The postcooling roller 52 also may be internally heated (as aforesaid) so that as belt 48 passes thereover through the cooling station, the temperature of the portion of the tool embossing pattern 16 is maintained at about the same temperature to which the belt 48 is lowered at the cooling station 80.

As previously noted, the present invention provides significant and unexpected improvements in the reflective efficiency of the sheeting produced thereby.

The first such improvement is achieved by causing the embossed laminate 69 and tool 48 to be abruptly and significantly cooled while the tool 48 and laminate 69 are in a generally planar position. Applicants have discovered that by promptly effecting such cooling in the "flat", a three-fold increase in specific intensity of the sheeting can be achieved, as compared to cooling around the roller 52.

In order to effect such prompt and full cooling, the cooling station designated generally 80 is provided on the embossing apparatus 28. The cooling station may consist of a simple shroud or manifold 81 closely spaced to the outer face of the carrier film 42 at the area located between the rolls 50 and 52, where the belt 48 is under tension and planar, and with the web 42 holding the formed sheeting 13 thereagainst. A suitable source for chilled fluid 83 and appropriate inlet and outlet ductwork 84 and 85 and a pump 86 for circulation of the chilled fluid also are provided. The chilled fluid may be water, air, or, for example, other gases or fluids such as liquid nitrogen. Satisfactory results have been achieved when the chilled fluid is on the order of about 50° F. so as to cause the laminate 69 and the tool 48 to quickly drop below 180° F. in temperature, and preferably cooled to a range of approximately 100° F. to 120° F. This rapid cooling below the glass transition temperature of the sheeting 13, while the formed cubes 14 and film carrier 42 are in a generally flat and undistorted condition, apparently effectively rigidifies or "freezes" the precision formed cube-corner elements 14 of the sheeting 13. Because the tool 48 is extremely thin, it is desirable to maintain its temperature at about 120° F. as it passes over the postcooling roller 52 and back toward the heating roller 50.

As previously noted, the space between rollers 50 and 52 is greatly exaggerated for illustrative purposes only. For rollers 50 and 52 of the diameters previously indicated, and the belt having the circumference previously indicated, the actual distance between the rollers, at the closest point, may be less than one inch, and the planar area may be on the order of about ten inches. For larger diameter rollers and a larger tool, this space and consequently the "flat" area available for cooling, will vary. The infusion of heat through the plastic web effectively controls the cooling in the planar area and therefor a larger planar area would be necessary to effectively cool at higher running speeds. The important aspect to achieve this unexpected improvement is that the cooling be effected while the tool and film are in a generally planar area and in an undistorted condition. The belt speed, distances and cooling temperatures will then be correlated to achieve the maximum increase in reflective efficiency.

A second important and unexpected improvement in reflective efficiency is provided by subsequently reheating the formed film to a relatively high temperature, in the range of 180° to 200° F., after the sheeting 13 and film 42 is cooled and stripped from the embossing tool 58. It has been found that this reheating, in the range indicated, generally provides an additional 25% or more increase in the reflective efficiency in sheeting which is cooled in the "flat", and an even greater percentage increase for sheeting which is simply cooled by passing it over the postcooling roller 52. While the particular phenomenon is not understood, it is believed that it is similar to an annealing process, wherein any stresses which are "frozen" into the film during the cooling stage are relieved, so that the cube-corner elements can relax to a condition very highly approximating the precision angles formed during the embossing stage. For purposes of this application therefore, this reheating step also may be referred to as annealing. The annealing step can be accomplished by running the material directly through the annealing or reheating oven 90, positioned directly near the embossing mechanism 20, so that annealing can be done in a continuous fashion. For example, the material may run through at a rate of four feet per minute, and the sheeting material would be subject to the annealing temperatures for at least ten minutes. Where continuous annealing is performed, it is desirable that there be some tension on the laminate 69, but it should be a very low tension which would be approximately less than one half pound of tension per inch of width of laminate.

It also has been found that it is desirable to run the material through the annealing oven while the mylar carrier film 42 still is associated with the formed sheeting, and that a lower reflective efficiency improvement is accomplished if performed without the film 42.

Alternatively, the finished roll of film with the Mylar thereon can be subjected to a static heating technique, where the entire roll is placed in an oven and allowed to be heated for an extended time period, until the entire roll reaches the designated temperature range. No set time can be provided since it will depend upon the size of the roll.

It has been found that if reheating occurs below 180° F., there apparently is insufficient "relief" of the cube-corner elements, and that if reheated above 200° F., there is a rather rapid drop in the reflective capability of the cube-corner elements, presumably because the material then loses its critical shape. It has been found that 195° F. is the optimum temperature for providing significant stability in the annealed cube-corner elements, while preserving the greatest degree of improved reflectivity. The concept of, and result of, the annealing step is unexpected. It has heretofore been believed that any reheating of an acrylic material used in forming cube-corner reflectors, whether injection molded or embossed, above 180° F., generally would cause those cube-corner elements to be distorted, either by sink marks or the like in the individual cube faces, or by changes in the dihedral angles between reflective faces, and therefore that this generally would result in a significant reduction in reflective efficiency. Thus, applicants present improved process, and the apparatus provided, enhance the reflective efficiency, provided the same is accomplished within the specified temperature range.

While the annealing step may prove beneficial in itself, without cooling of the sheeting in the "flat", it is believed that the combination of both cooling the film, while in its planar condition, and subsequently annealing same on a continuous basis, together provide unexpected and improved results in the reflective efficiency of the embossed sheeting 13.

It also should be understood that it is possible that for certain environmental conditions, a second layer of thermoplastic material, having either specific UV inhibitors or otherwise somewhat dissimilar from the web 13, will simultaneously be run through the embossing equipment with the film 13 and the web 42. Under these circumstances, an additional feed roller may be utilized or, alternatively, the additional layer of thermoplastic material may be prelaminated to the web 13 before it is provided as roll 36.

The improved results obtained by the improved methods and apparatus claimed herein also are achieved when a laminate of such thermoplastic materials is used. As an example of the laminate that might be used, the film or web 13 could be a rubber modified polymethylmethacrylate, sold by the Rohm & Haas Company, under its designation Plexiglas DR, and and it will be about 6 mils. thick. An additional layer of thermoplastic material about 2 mils. thick may be applied directly from a separate feed roller, or previously laminated to sheet 13, and may consist of an acrylic material such as Korad D, sold by Polymer Extruded Products, Inc. of Newark, N.J. This material then serves as the outer surface of the finished sheeting and has significant UV inhibitors therein whereby the sheeting may be used to meet specific adverse environmental characteristics.

While relatively high pressures should be used in forming the precision cube-corner elements, pursuant to the existing embossing techniques and apparatus, a minimum of 50 pounds per square inch gauge pressure should be applied through the pressure rollers 58 to the web 13, film 42 and the tool 58, as they pass through the embossing equipment, in order to achieve a reasonable initial minimum level of reflective intensity for the film. It has been found that the laminate 69 can be processed through the embossing means 28 at the rate of about 3 to 4 feet per minute, with satisfactory results in terms of the optical performance and other pertinent properties of the finished reflective sheeting. Prior to shipping the reflective sheeting 12, the film 42 may be stripped therefrom.

It should be noted that reference numeral 13 may refer indiscriminately herein to the embossed sheeting or web in its initial form, to its in-process form or to its final reflective form, as appropriate.

The term "glass transition temperature" is a well known term of art and is applied to thermoplastic materials as well as glass. For purposes herein, it is the temperature at which the material is viscous and begins to flow when heated. For various extendable types of acrylic, the glass transition temperatures begin at about 200° F. For polyester (Mylar), it begins at about 480° F. to 490° F.

A preferred material for the embossing tool disclosed herein is nickel. The very thin tool (about 0.010" to about 0.030") permits the rapid heating and cooling of the tool, and the sheet, through the required temperature gradients while pressure is applied by the pressure rolls and the carrier film. The result is the continuous production of a precision pattern where flatness and angular accuracy are important while permitting formation of sharp corners with minimal distortion of optical surfaces, whereby the finished sheet provides high optical efficiency.

The invention, in its various aspects and disclosed forms, is well adapted to the attainment of the stated objects and advantages and others. The disclosed details are not to be taken as limitations on the invention, except as those details may be included in the appended claims.

What is claimed is:

1. An improved method for continuously embossing a precision optical pattern requiring sharp angles and flatness of faces in certain detail on one surface of a continuous resinous sheeting material, the method being performed with the aid of a generally cylindrical endless metal embossing element having an inner surface and an outer surface, the outer surface having a precision optical embossing pattern which is the reverse of the precision optical pattern to be formed on one surface of said sheeting, and wherein the method includes the steps of:

(a) continuously moving the endless embossing element along a closed course through a heating station, where said embossing element is heated through its inner surface to a predetermined temperature and then to a cooling station where said embossing element is cooled below said predetermined temperature;

(b) continuously feeding onto said embossing element as it passes through a part of said heating station superimposed resinous film and sheeting materials, said resinous materials of said film and said sheeting each having different glass transition temperatures, said sheeting being in direct contact with the outer precision patterned surface of said embossing tool;

(c) continuously heating said embossing element to said predetermined temperature at said heating station, said temperature being greater than the glass transition temperature of said sheeting and less than the glass transition temperature of said resinous film;

(d) pressing said superimposed film and sheeting against said embossing element at a plurality of pressure points sequentially spaced along said heating station with one surface of said sheeting confronting and engaging said precision optical pattern on said embossing element until said one surface of said sheeting conforms to said precision optical embossing pattern;

(e) continuously passing said embossing element and said superimposed film and sheeting through said cooling station where the temperature of said embossing element and said sheeting is lowered below said sheeting glass transition temperature, with said film serving to substantially continuously maintain said sheeting in engagement with said embossing element through the heating station and through said cooling station; and (f) continuously stripping said superimposed layer of film and embossed sheeting from said embossing element, said film being later strippable from the other face of said sheeting without destroying said optical pattern formed on said one face of said sheeting, the improvement comprising:

(g) said cooling step being substantially effected while said superimposed film and sheeting and embossing tool are disposed in a generally planar condition, thereby to achieve an increase in the optical efficiency of the embossed sheeting.

2. The method of claim 1, wherein said course is cylindrical through the heating station and said pressure points are provided by at least three spaced pressure rollers, and said course is generally planar through said cooling station.

3. The method of claim 1, wherein said cooling is achieved by directing a chilled fluid against said sheeting and said film, thereby to effect an abrupt and substantial drop in temperature thereof and thereby to quickly rigidify the precision optical elements while the embossing element and formed sheeting are in a generally undistorted condition.

4. The method of claim 1, wherein said embossing tool is a thin flexible seamless metal belt, the heating station is a heated roller, and said cooling station is in juxtaposition with said film as said element leaves said heating roller and passes through said planar area, and includes means for directing a chilled fluid against said film as it passes thereover.

5. The method of claim 4 wherein said means for directing a chill fluid against said film as it passes thereover includes a cooling manifold.

6. The method of claim 1, wherein the temperature of said sheeting is lowered to about 120° F. at said cooling station.

7. The method of claim 1, wherein said sheeting is acrylic, said film is polyester, the temperature of said embossing pattern at said heating station is sufficiently high to raise the temperature of said sheeting to a range between 425° F. and 475° F., and the temperature at said cooling station is sufficiently low to lower the temperature of said sheeting to 180° F. or below as said sheeting passes through said cooling station.

8. The method of claim 1, wherein said precision optical pattern is in the form of an array of female cube-corner type elements whereby the sheeting formed thereby has male cube-corner elements on the one face thereof in contrast with said tool, and the finished sheeting thereby is provided with an array of retroreflective cube-corner elements thereon.

9. The method set forth in claim 1, and further including the step of reheating said embossed sheeting and film to a temperature in the range of about 180° F. to 200° F. thereby to improve the optical efficiency of said embossed sheeting.

10. The method set forth in claim 9, wherein the temperature achieved in said sheeting at reheating is about 195° F.

11. The method set forth in claim 9, wherein said reheating is accomplished on a continuous basis by causing said superimposed layer of embossed sheeting and film to be continuously directed through a reheating station after said film and sheeting are stripped from said embossing element.

12. The method set forth in claim 9, wherein said stripped film and sheeting are reheated long enough to assure that all of the film and embossed sheeting reaches a temperature in the range between 180° F. and 200° F.

13. An improved method for continuously embossing a precision optical pattern requiring sharp angles and flatness of faces in certain detail on one surface of a continuous resinous sheeting material, the method being performed with the aid of a generally cylindrical endless metal embossing element having an inner surface and an outer surface, the outer surface having a precision optical embossing pattern which is the reverse of the precision optical pattern to be formed on one surface of said sheeting, and wherein the method includes the steps of:
 (a) continuously moving the endless embossing element along a closed course through a heating station, where said embossing element is heated through its inner surface to a predetermined temperature and then to a cooling station where said embossing element is cooled below said predetermined temperature;
 (b) continuously feeding onto said embossing element as it passes through a part of said heating station superimposed resinous film and sheeting materials, said resinous materials of said film and said sheeting each having different glass transition temperatures, said sheeting being in direct contact with the outer precision patterned surface of said embossing tool;
 (c) continuously heating said embossing element to said predetermined temperature at said heating station, said temperature being greater than the glass transition temperature of said sheeting and less than the glass transition temperature of said resinous film;
 (d) pressing said superimposed film and sheeting against said embossing element at a plurality of pressure points sequentially spaced along said heating station with one surface of said sheeting confronting and engaging said precision optical pattern on said embossing element until said one surface of said sheeting conforms to said precision optical embossing pattern;
 (e) continuously passing said embossing element and said superimposed film and sheeting through said cooling station where the temperature of said embossing element and said sheeting is lowered below said sheeting glass transition temperature, with said film serving to substantially continuously maintain said sheeting in engagement with said embossing element through the heating station and through said cooling station; and
 (f) continuously stripping said superimposed layer of film and embossed sheeting from said embossing element, said film being later strippable from the other face of said sheeting without destroying said optical pattern formed on said one face of said sheeting, the improvement comprising the step of:
 (g) reheating said embossed sheeting and film to a temperature in the range of about 180° F. to 200° F., thereby to relieve any strain in said film caused by cooling thereof at said cooling station.

14. The method set forth in claim 13, wherein the temperature achieved in said reheating is about 195° F.

15. The method set forth in claim 13, wherein said reheating is accomplished on a continuous basis by causing said superimposed layer of embossed sheeting and film to be continuously directed through a reheating station after said film and sheeting are stripped from said embossing element.

16. The method set forth in claim 13, wherein said stripped film and sheeting are heated long enough to assure that all of the film and embossed sheeting reaches a temperature in the range between 180° F. and 200° F.

17. Apparatus for continuously embossing a precision optical pattern on one surface of transparent resinous material or materials, said apparatus comprising:
 embossing means including a continuous seamless embossing tool in the form of a thin metal element having an inner surface and an outer surface, said outer surface having a precision optical embossing pattern thereon which is the reverse of the precision optical pattern to be formed in the resinous material;
 means for continuously moving said embossing element along a closed course;
 means for introducing superimposed film and sheeting of resinous materials onto said embossing element with one face of said sheeting in direct contact with said optical pattern on said embossing element;
 heating means for raising the temperature of said embossing pattern to be above the glass transition temperature of said sheeting and below the glass transition temperature of said film while said embossing element is in a first portion of its course;
 cooling means for lowering the temperature of said sheeting to be below said glass transition temperature while said element and said sheeting are in a generally planar condition in their course, thereby to rigidify said precision pattern while in an undistorted condition;

a plurality of pressure means sequentially spaced along said first portion of said course for pressing said superimposed film and sheeting against said embossing element with said one surface of said sheeting confronting and engaging said embossing pattern until said one surface conforms to said embossing pattern, with said film serving to substantially continuously maintain said sheeting in engagement with said embossing element until the latter passes said second portion of said course; and means for thereafter stripping said superimposed film and sheeting from said embossing element.

18. The apparatus of claim 17, wherein said embossing element is a thin seamless flexible metal belt.

19. The apparatus of claim 17, wherein said heating means is provided by an internally heated heating roller and said cooling means includes a manifold adopted to direct a chilled fluid against said film and said sheeting and said tool as said film passes thereover.

20. The apparatus of claim 17, wherein said precision optical pattern comprises an array of cube-corner type reflective elements.

21. The apparatus set forth in claim 17, and further including means for reheating said superimposed sheeting and film to a temperature in the range of 180° F. to 200° F. after stripping thereof from said embossing element.

22. The apparatus set forth in claim 21, wherein said reheating means is arranged to continuously reheat said superimposed film and sheeting as the same are continously stripped from said embossing element.

23. Apparatus for continuousy embossing a precision optical pattern on one surface of transparent resinous material or materials, said apparatus comprising;

embossing means including a continuous seamless embossing tool in the form of a thin metal element having an inner surface and an outer surface, said outer surface having a precision optical embossing pattern thereon which is the reverse of the precision optical pattern to be formed in the resinous material;

means for continuously moving said embossing element along a closed course;

means for introducing superimposed film and sheeting of resinous materials onto said embossing element with one face of said sheeting in direct contact with said optical pattern on said embossing element;

heating means for raising the temperature of said embossing pattern to be above the glass transition temperature of said sheeting and below the glass transition temperature of said film while said embossing element is in a first portion of its course;

cooling means for lowering the temperature of said sheeting to be below said glass transition temperature while said element and said sheeting are in a generally planar condition in their course, thereby to rigidify said precision pattern while in an undistorted condition;

a plurality of pressure means sequentially spaced along said first portion of said course for pressing said superimposed film and sheeting against said embossing element with said one surface of said sheeting confronting and engaging said embossing pattern until said one surface conforms to said embossing pattern, with said film serving to substantially continuously maintain said sheeting in engagement with said embossing element until the latter passes said second portion of said course;

means for thereafter stripping said superimposed film and sheeting from said embossing element; and means for reheating said superimposed sheeting and film to a temperature in the range of 180° F. to 200° F. after stripping thereof from said embossing element.

* * * * *